(12) United States Patent
Chakra et al.

(10) Patent No.: US 9,385,982 B2
(45) Date of Patent: Jul. 5, 2016

(54) IDENTIFICATION TO A RECIPIENT OF AN ELECTRONIC COMMUNICATION OF ANOTHER USER WHO HAS ACCESSED THE ELECTRONIC COMMUNICATION

(75) Inventors: Al Chakra, Apex, NC (US); Liam Harpur, Skerries (IE); Michelle M. Purcell, Tullamore (IE); John Rice, Waterford (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 995 days.

(21) Appl. No.: 13/276,737

(22) Filed: Oct. 19, 2011

(65) Prior Publication Data
US 2013/0103756 A1    Apr. 25, 2013

(51) Int. Cl.
*G06F 15/16*    (2006.01)
*H04L 12/58*    (2006.01)

(52) U.S. Cl.
CPC .............. *H04L 51/14* (2013.01); *H04L 51/34* (2013.01)

(58) Field of Classification Search
CPC ............................. H04L 51/14; H04L 51/34
USPC ........... 709/206, 220, 227, 203, 224; 707/737
See application file for complete search history.

(56) References Cited

U.S. PATENT DOCUMENTS

| | | | |
|---|---|---|---|
| 7,853,622 B1 * | 12/2010 | Baluja et al. | 707/803 |
| 7,865,379 B2 * | 1/2011 | Sussman et al. | 705/5 |
| 8,145,679 B1 * | 3/2012 | Baluja et al. | 707/802 |
| 9,152,946 B2 * | 10/2015 | Rankin, Jr. | G06Q 10/10 |
| 2003/0195884 A1 * | 10/2003 | Boyd et al. | 707/7 |
| 2006/0047762 A1 | 3/2006 | Su et al. | |
| 2010/0125636 A1 | 5/2010 | Kuhlke et al. | |
| 2011/0289161 A1 * | 11/2011 | Rankin et al. | 709/206 |

OTHER PUBLICATIONS

"Return Receipt," [online] Eudora.com, QUALCOMM Incorporated, (retrieved Jul. 29, 2011) retrieved from the Internet: <http://www.eudora.com/techsupport/kb/1645hq.html>, 2 pgs.

* cited by examiner

*Primary Examiner* — Khanh Dinh
(74) *Attorney, Agent, or Firm* — Cuenot, Forsythe & Kim, LLC

(57) ABSTRACT

A method of utilizing electronic communication activity information. The method can include receiving from each of a plurality of electronic communication clients activity information relating to activities of a respective electronic communication recipient accessing information associated with the electronic communication. Based on the received activity information, via a processor, each of the electronic communication recipients can be rated to generate at least one recommendation as to who is able to provide information pertaining to the electronic communication. The recommendation can be communicated to another electronic communication recipient.

23 Claims, 5 Drawing Sheets

200

```
┌─────────────────────────────────────────────────────────────────────────┐
│ Receive from each of a plurality of electronic communication clients    │
│ activity information relating to activities of a respective electronic  │
│ communication recipient accessing information associated with the       │
│ electronic communication                                                │
│                                                                     202 │
└─────────────────────────────────────────────────────────────────────────┘
                                    ↓
┌─────────────────────────────────────────────────────────────────────────┐
│ Based on the received activity information, via a processor, rate each  │
│ of the plurality of electronic communication recipients with regard to  │
│ who is able to provide to other recipients information pertaining to    │
│ the electronic communication                                            │
│                                                                     204 │
└─────────────────────────────────────────────────────────────────────────┘
                                    ↓
┌─────────────────────────────────────────────────────────────────────────┐
│ Receive from another electronic communication recipient a request to    │
│ receive a recommendation as to who is able to provide information       │
│ pertaining to the electronic communication                              │
│                                                                     206 │
└─────────────────────────────────────────────────────────────────────────┘
                                    ↓
┌─────────────────────────────────────────────────────────────────────────┐
│ Optionally, identify attributes of each of the plurality of electronic  │
│ communication recipients related to attributes of the other electronic  │
│ communication recipient                                                 │
│                                                                     208 │
└─────────────────────────────────────────────────────────────────────────┘
                                    ↓
┌─────────────────────────────────────────────────────────────────────────┐
│ Optionally, weight attributes of each of the respective plurality of    │
│ electronic communication recipients based upon a correspondence of such │
│ attributes with related attributes of the other electronic              │
│ communication recipient                                                 │
│                                                                     210 │
└─────────────────────────────────────────────────────────────────────────┘
                                    ↓
┌─────────────────────────────────────────────────────────────────────────┐
│ Optionally, for each of the plurality of electronic communication       │
│ recipients, process the weighted attributes with the rating of the      │
│ respective electronic communication recipient                           │
│                                                                     212 │
└─────────────────────────────────────────────────────────────────────────┘
                                    ↓
┌─────────────────────────────────────────────────────────────────────────┐
│ Generate at least one recommendation as to who is able to provide       │
│ information pertaining to the electronic communication to the other     │
│ recipient, the recommendation being based on the received activity      │
│ information and, optionally, further based on the respective weighted   │
│ attributes                                                              │
│                                                                     214 │
└─────────────────────────────────────────────────────────────────────────┘
                                    ↓
┌─────────────────────────────────────────────────────────────────────────┐
│ Communicate the recommendation to the other electronic communication    │
│ recipient                                                           216 │
└─────────────────────────────────────────────────────────────────────────┘
```

| Via an electronic communication client executed by a processor, monitor activity information relating to activities of a respective electronic communication recipient associated with an electronic communication, the activity information indicating at least an amount of time that the electronic communication is opened in the electronic communication client |
|---|
| 302 |

| Communicate to an electronic communication server the activity information |
|---|
| 304 |

FIG. 3

IDENTIFICATION TO A RECIPIENT OF AN ELECTRONIC COMMUNICATION OF ANOTHER USER WHO HAS ACCESSED THE ELECTRONIC COMMUNICATION

BACKGROUND

One or more embodiments disclosed within this specification relate to electronic communications.

With the proliferation of Internet access in recent decades, the use of electronic communication to exchange digital messages from an author to one or more recipients has become commonplace. Examples of electronic communications include electronic mail, text messages and instant messages. Electronic communications typically are communicated across the Internet or other computer networks.

E-mail systems, for example, generally are based on a store-and-forward model in which e-mails are stored in an e-mail client and/or e-mail server and forwarded to one or more recipients. In this regard, e-mail servers generally are configured to accept, forward, deliver and store e-mail messages. E-mail clients commonly are used to generate, send, forward and receive e-mails. The e-mail clients may reside on a user's communication device (e.g., workstation, personal computer, mobile computer, tablet computer, personal digital assistant, mobile telephone, etc.), or on a server to which the user's communication device is communicatively linked. Via an e-mail client, the user may generate an e-mail, and identify one or more recipients to whom the e-mail may be sent. The e-mail recipients can include those who are identified in a "To" field, those identified in a "Cc" field, and those identified in a "Bcc" filed. "Cc" is an acronym for the term "carbon copy" and "Bcc" is an acronym for the term "blind carbon copy." "Carbon copy" and "blind carbon copy" are legacy terms from when carbon paper commonly was used to produce one or more copies simultaneously during the creation of paper. Such terms have been carried over to modern electronic communication systems, even though electronic communication systems do not rely on carbon paper to create copies.

The recipients identified in the "To" field usually are the recipients to whom the content of the e-mail is directed. The recipients in the "Cc" field usually are those recipients to whom the content is not specifically directed, but who are to be made aware of the e-mail content. Those recipients identified in the "To" and "Cc" fields typically are identified in e-mails that are sent. Thus, all recipients receiving an e-mail usually will be made aware of each of the recipients identified in the "To" field and the "Cc" field.

The recipients in the "Bcc" field usually are those recipients to whom the content of the e-mail is not specifically directed, who are to be made aware of the e-mail content, but whom the sender of the e-mail wishes to remain unidentified in the e-mails sent to other recipients. Thus, recipients of e-mails typically are not made aware of other recipients who are identified in the "Bcc" field.

BRIEF SUMMARY

One or more embodiments disclosed within this specification relate to a method of utilizing electronic communication activity information. The method can include receiving from each of a plurality of electronic communication clients activity information relating to activities of a respective electronic communication recipient accessing information associated with the electronic communication. Based on the received activity information, via a processor, each of the electronic communication recipients can be rated to generate at least one recommendation as to who is able to provide information pertaining to the electronic communication. The recommendation can be communicated to another electronic communication recipient.

Another embodiment can include, via an electronic communication client executed by a processor, monitoring activity information relating to activities of a respective electronic communication recipient associated with an electronic communication. The activity information can indicate at least an amount of time that the electronic communication is opened in the electronic communication client. The activity information can be communicated to an electronic communication server.

Another embodiment can include a computer-program product. The computer program product can include a computer-readable storage medium having computer-readable program code embodied therewith, the computer-readable program code including computer-readable program code configured to perform the various operations and/or functions disclosed within this specification.

BRIEF DESCRIPTION OF THE SEVERAL VIEWS OF THE DRAWINGS

FIG. 2 is a flow chart illustrating a method of utilizing electronic communication activity information in accordance with another embodiment of the present invention.

FIG. 3 is a flow chart illustrating another method of utilizing electronic communication activity information in accordance with another embodiment of the present invention.

DETAILED DESCRIPTION

Figure 1:
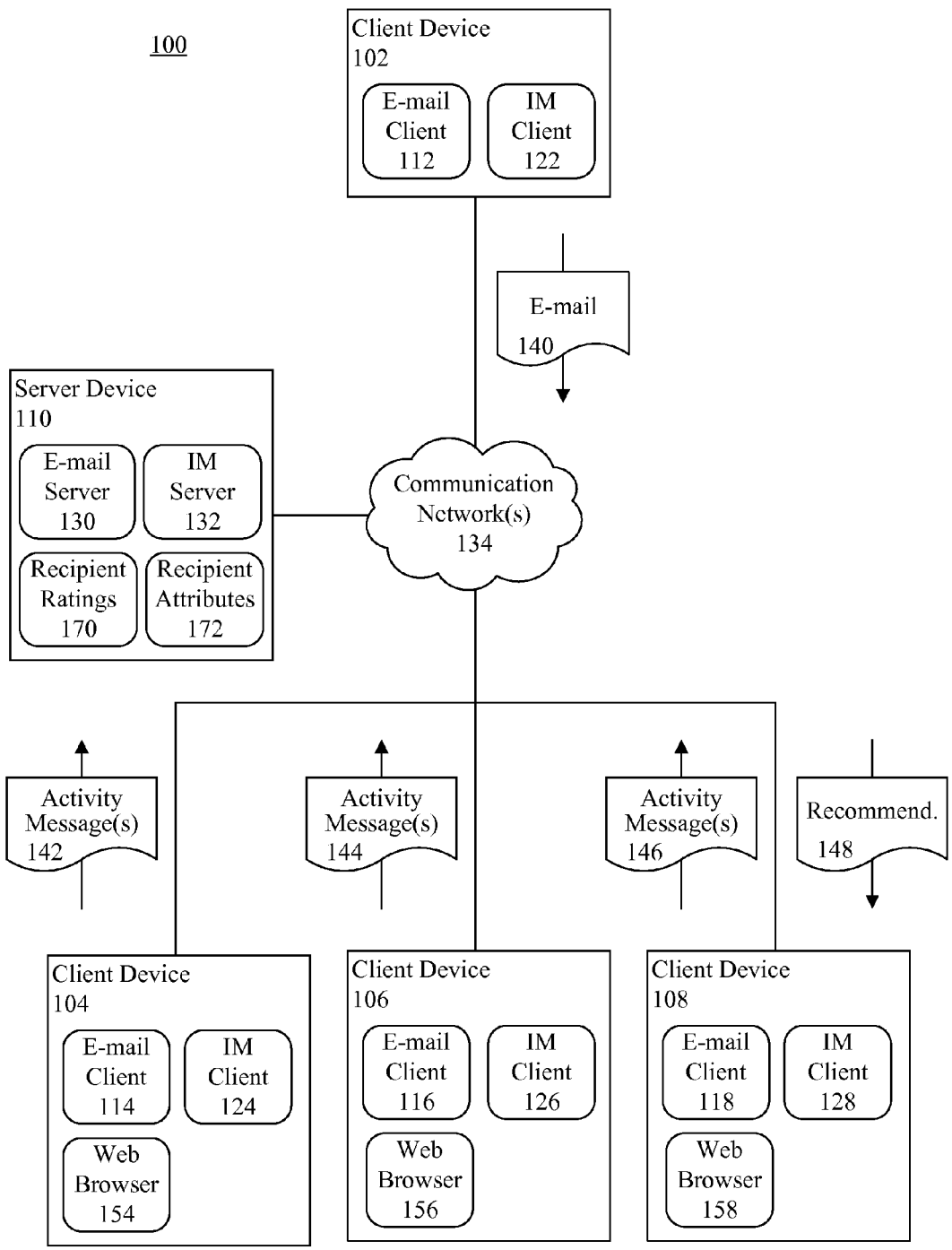
FIG. 1 is a block diagram illustrating a system for utilizing electronic communication activity information in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments in accordance with the present invention relate to the use of electronic communication activity information. Specifically, electronic communication activity information can be processed to identify electronic communication recipients who have accessed (e.g., opened) the electronic communication, when such accesses occurred, and/or recipient activity associated with electronic communication. Based on the electronic communication activity information, electronic communication recipients who have accessed the electronic communication can be identified as being potential contacts for other recipients who have questions regarding the electronic communication. Accordingly, an electronic communication recipient need not bother the original sender of the electronic communication with questions that potentially may be answered by another recipient. Instead, the electronic communication recipient can direct questions to another electronic communication recipient who may have knowledge about the electronic communication content. The electronic communication can be an electronic mail (e-mail), a text message, an instant message, or any other communication that may be electronically sent, for example via a communication network.

By way of example, assume a recipient receives a mass e-mail from a chief executive officer (CEO) of a large organization, and the recipient has questions regarding the e-mail. For various reasons, the recipient may not be comfortable directing questions pertaining to the e-mail to the CEO. In accordance with the present invention, the recipient can be provided contact information for at least one other e-mail recipient who has reviewed the e-mail and to whom the recipient may be more comfortable with directing questions. Moreover, the original sender of the e-mail need not be inundated with questions that potentially may be answered by others who received the e-mail.

FIG. 1 is a block diagram illustrating a system 100 for utilizing electronic communication activity information in accordance with one embodiment of the present invention. In one embodiment, the electronic communication can be an e-mail, but this need not be the case. As noted, the electronic communication can be any other communication electronically sent to a plurality of recipients.

The system 100 can include a plurality of client devices 102, 104, 106 and 108. The client devices 102-108 can be computers (e.g., workstations, personal computers, mobile computers, notebook computers, netbook computers, tablet computers, etc.), personal digital assistants (PDAs), mobile telephones, or any other processing devices that include at least one processor suitably configured to send and/or receive electronic communications. In this regard, each client device 102-108 can include a respective electronic communication client presented thereon. For example, each client device 102-108 can include a respective e-mail client 112, 114, 116, 118, a respective instant messaging (IM) client 122, 124, 126, 128. In addition to, or in lieu of, the IM clients 122-128, each of the client devices 102-108 can include a respective text messaging client (not shown). For simplicity, the use of IM clients 122-128 will be discussed herein, but it will be understood that such discussion also is applicable to text messaging clients.

The e-mail clients 112-118 and IM clients 122-128 can be client-side applications executing on the client devices 102-108, or server side applications executing on a server to which the clients' devices 102-108 are communicatively linked. In illustration, the e-mail clients 112-118 can be presented on respective displays of the client devices 102-108 within a web browser or other suitable application. In addition, the e-mail clients 112-118 and/or IM clients 122-128 can be configured to perform various client-side methods and processes described herein.

The system 100 also can include at least one server device 110. The server device 110 can be a computer or other processing system that includes at least one processor. An electronic communication server, for example an e-mail server 130, IM server 132 and/or a text messaging server (not shown), can execute on the server device 110. The e-mail server 130 can be an application configured to accept, forward, deliver and store e-mail messages. In addition, the e-mail server 130 can be configured to perform various server-side methods and processes described herein. Similarly, the IM server 132 can be an application configured to accept, forward and deliver instant messages and/or text messages, and the IM server 132 can be can be configured to perform various server-side methods and processes described herein. For illustration purposes, operation of an e-mail server 130 is discussed in the example described in FIG. 1, but the invention is not limited in this regard and similar operations can be implemented by the server 132 and/or a text messaging server.

The client devices 102, 104, 106 and 108 and the server device 110 can be communicatively linked via one or more communication networks 134. The communication network(s) 134 can include the Internet, one or more WANs, one or more LANs, one or more wireless LANs, one or more cellular communication networks, and/or any other communication networks via which e-mails can be communicated.

In operation, the client device 102 can send an electronic communication, for example an instant message, a text message or an e-mail 140, to a plurality of electronic communication recipients, for instance to electronic communication recipients associated with the respective e-mail clients 114-118 and/or IM clients 124-128. Again, for illustration purposes, the description of FIG. 1 presented herein will describe methods and processes for processing an electronic communication generated in the form of the e-mail 140, but it will be understood that such methods and processes can be applied to text messages, instant messages, or the like.

In this example, the e-mail 140 can identify a plurality of recipients in a "To" field and/or in a "Cc" field. The e-mail 140 can be communicated to the recipients via the e-mail server 130 in a suitable manner, for example using conventional e-mail processing techniques known in the art. One or more other e-mail servers also can participate in the communication of the e-mail 140 to the plurality of e-mail recipients, though the invention is not limited in this regard.

Each of the e-mail clients 114-118 can be configured to identify and/or track various recipient activities associated with the e-mail 140, content within the e-mail 140 and/or attachments to the e-mail 140. The e-mail clients 114-118 can process information related to the recipient activities, and generate one or more activity messages 142, 144, 146 containing activity information related to the activities. The e-mail clients 114-118 can send the activity messages 142-146 to the e-mail server 130, which can process the activity information to generate recommendations 148 for one or more of the recipients to indicate other recipients who may be able to provide information, such as helpful insights or supplemental information, pertaining to the e-mail 140. In illustration, the recommendations 148 can indicate who may be able to answer questions related to the e-mail 140. Such recommendations 148 will be discussed herein in further detail. At this point it should be noted that tracking of the various recipient activities can be selectively enabled or disabled, for example via user settings in the respective client devices 104-108 or in client profiles managed by a server, such as a domain server.

With respect to identifying the e-mail related activities, each of the e-mail clients 114-118 can be configured to identify when a respective recipient of the e-mail 140 accesses (e.g., opens) the e-mail 140 and identify an amount of time the e-mail 140 is open. Each of the e-mail clients 114-118 also can be configured to identify whether a respective recipient accesses (e.g., opens) one or more attachments to the e-mail. If an e-mail recipient accesses the attachment(s), the recipient's respective e-mail client 114-118 can identify when such attachment(s) was/were opened and identify an amount of time the attachment(s) was/were open. In this regard, each client device 104-108 can include a clock to identify when recipient activities occur and a timer to identify an amount of time certain activities continue. The clocks and timers can be integrated into the e-mail clients 114-118, though this need not be the case. With respect to identifying an amount of time activities continue, the timers can be configured with a timeout to stop the timers after a certain period of user inactivity, and re-start when user activity related to the e-mail 140 is again detected. In one embodiment, a camera, for example a camera within or otherwise communicatively linked to a client device 104-108 can identify when a recipient leaves the client device 104-108 and when the recipient returns to the client device 104-108 to stop and re-start a timer.

Further, each of the e-mail clients 114-118 can be configured to identify whether a respective recipient selects one or more hyperlinks contained in the e-mail 140 to access content, such as a web page, a file, a document, or the like. The e-mail clients 114-118 also can identify when the hyperlink(s) was/were open and identify an amount of time the content associated with the hyperlink(s) is/are open. For example, an e-mail client 114-118 can track an amount of time a web browser 154, 156, 158 on a respective client device 104-108 is open. In addition, the e-mail client 114-118 can track user activity detected in the web browser 154-158. For instance, the e-mail client 114-118 can communicate with the web browser 154-158 to track navigation inputs, such as navigation inputs entered using a mouse, touchpad, keyboard, touch screen or the like.

The e-mail client 114-118 also can track an amount of time an e-mail recipient spends in an IM session and/or other IM session activity that potentially may be related to the e-mail 140. For instance, the e-mail client 114-118 can track IM session activity for an IM session started while the e-mail 140 is opened, or IM session activity for an IM session started immediately preceding or following the e-mail 140 being opened or closed. In one embodiment, the e-mail client 114-118 can communicate with a respective IM client 124-128 to identify whether content of the e-mail 140 is being discussed in the IM session, and determine a level of correlation between the information exchanged in the IM session and the content of the e-mail 140. By way of example, the IM client 124-128 can be configured to communicate information, such as text and/or audio information, exchanged in an IM session to the e-mail client 114-118, and the e-mail client 114-118 can determine whether any of the IM information corresponds to content contained in the e-mail 140 and/or an attachment to the e-mail 140. Moreover, the e-mail client 114-118 can determine how much IM information corresponds to the e-mail 140 and/or attachment content, and/or what portion or percentage of the IM information corresponds to the e-mail 140 and/or attachment content.

As noted, information corresponding to the various activities related to the e-mail 140 performed by the recipients can be processed by the recipients' respective e-mail clients 114-118 to generate the activity messages 142-146. The activity messages 142-146 can be associated with the respective recipients and communicated from the respective e-mail clients 114-118 to the e-mail server 130. In sum, the activity messages 142-146 can indicate the various recipient activities that take place, when the activities take place, and an amount of time the activities last. The activity messages 142-146 also can indicate a level of correlation between the activities and the e-mail 140 and/or one or more attachments to the e-mail 140. For example, the activity message 142 can indicate a level of correlation between IM communications involving a respective recipient and content contained in the e-mail 140.

The e-mail server 130 can receive the activity messages 142-146 and process the activity messages 142-146 to generate for each of the recipients a recipient rating 170 that represents a likely familiarity of the recipient with the content of the e-mail 140. The recipient ratings 170 can be, for instance, represented by numerical values. Each recipient rating 170 can be updated, either periodically or continually, based on when the detected activities of the respective recipients took place. In illustration, a particular value can be assigned as a recipient rating 170 when a respective activity message 142-146 is received, and the value assigned to that recipient rating 170 can be decremented as time elapses from when activity message 142-146 was received. Accordingly, the recipient rating 170 can be updated to reflect the recipient's likely familiarity with the subject matter of the e-mail 140. In other words, when the recipient initially reviews the e-mail 140 and/or e-mail attachments, the user likely will be very familiar with the information provided by the e-mail 140. As time elapses, the recipient may begin to forget aspects of the information. The recipient rating 170 can account for this potential loss of memory. Any suitable algorithm can be implemented by the e-mail server 130 to arrive at the recipient ratings 170, and the invention is not limited in this regard.

In addition to generating the recipient ratings 170, the e-mail server 130 also can identify attributes 172 for the respective recipients. For example, the e-mail server 130 can identify respective organizations with which each recipient is associated. In illustration, if a recipient is an employee of a particular organization or a particular division within an organization, the e-mail server 130 can associate that organization or division with the recipient. The attributes 172 also can indicate a location for each of the respective recipients, for example current locations and/or default locations of the recipients. The default locations can be locations where recipients commonly are present (e.g., office locations, home locations, etc.). The default locations can be identified based on an IP address of the recipients' respective client device 104-108, or a village, city, state, province, country, time zone, etc. associated with the recipient's user profile. Further, the attributes 172 can indicate a default language associated with each of the recipients. The default language for each recipient can be identified from the recipient's user profile and/or from the recipient's default location.

The attributes 172 for each recipient can be processed with the recipient's respective recipient rating 170 to determine whether to include the recipient in the recommendation 148 provided to another recipient. As noted, the recommendation can indicate to whom questions pertaining to the e-mail 140 should be directed. By way of example, assume a recipient associated with the e-mail client 118 has questions regarding the e-mail 140. The e-mail client 118 can present to the recipient an option to be receive a recommendation 148 of at least one other recipient of the e-mail 140 who may be able to answer the recipient's questions. The option can be presented as a user selectable object, such as a button, an icon, a menu item, or the like. The recipient can select the object to initiate a request to the e-mail server 130 to provide the recommendation 148.

When the e-mail server 130 receives the request, the e-mail server can process the recipient ratings 170 and attributes 172 of other recipients to identify at least one other recipient who is to be identified in the recommendation 148 as a potential contact, and thus as a person to whom the recipient may direct questions. The e-mail server 130 can apply weights to the attributes 172 associated with the other recipients, and process such weights with the recipient ratings 170 to arrive at the recommendation. In illustration, the e-mail server 130 can identify the recipient sending the request, and access related recipient attributes 172 associated with the requestor and the other recipients. By processing attributes 172 of the requesting recipient and the related attributes 172 of other e-mail recipients, the e-mail server 130 can apply weights to the attributes 172 of the other recipients based upon the level of correspondence between the requestor's attributes 172 and the respective attributes 172 of the other recipients. Any suitable algorithms can be implemented to apply the weights to the attributes 172 and process the weights with the recipient ratings 170, and the invention is not limited in this regard.

In illustration, organization attributes for other recipients belonging to the same organization as the recipient sending the request can be weighted higher than organization attributes for other recipients not belonging to the same organization as the requesting recipient. Further, location attributes for other recipients having a proximate location to the requesting recipient's location can be weighted higher than location attributes for other recipients not proximate to the requesting recipient's location. Moreover, language attributes for other recipients having the same native language as the requesting recipient can be weighted higher than language attributes for other recipients not having the same native language attribute as the requesting recipient.

In one embodiment, the recommendation 148 can include a list of potential recipients to whom questions can be presented. The list can be presented to the requesting recipient in a hierarchical order based upon the various recipient ratings 170 and/or the attributes 172. For example, the weight of each attribute 172 for a particular recipient can be added to the recipient's recipient rating 170, or the recipient's recipient rating 170 can be multiplied by the cumulative weights of each attribute 172, to arrive at an overall score for each recipient. The list can prioritize the other recipients based on such score.

If the recommendation 148 merely provides one identifier for another recipient automatically selected in with the processes described, the recipient receiving the recommendation 148 can select that recipient to direct questions regarding the e-mail 140. In illustration, the recommendation 148 can provide an e-mail address, IM user identifier and/or telephone number associated with the other recipient which the requesting recipient can use to contact the other recipient. If, however, the recommendation 148 includes a list of a plurality of identifiers of other recipients, the list can be presented to the requesting e-mail recipient as a menu, and the requesting recipient can select from the menu another recipient to whom to direct questions regarding the e-mail 140. Further, the list can indicate the recipient attributes 172 associated with each of the other recipients identified in the list to facilitate selection of the person to whom to direct questions. For example, the list can indicate respective organizations to which the other recipients belong, location information for the other recipients, native languages for each of the other recipients, time zones in which the other recipients are located, and/or any other recipient attributes.

From the recommendation 148, the e-mail recipient can select another recipient to initiate communication regarding the recipient's questions. For example, the recipient can initiate an e-mail, an IM, a telephone call or an audio/video call. Such communication can be automatically initiated when the other recipient is selected. For example, if the recipient selects to initiate an e-mail, the e-mail client 118 can present a view of an e-mail automatically directed to the other recipient. If the recipient selects to initiate an IM, the e-mail client 118 can automatically interface with the IM client 128 to present view of an IM automatically directed to the other recipient. If the recipient selects to initiate a telephone call, the e-mail client 118 can automatically interface with a telephone or telecommunications application to initiate the telephone call. If the recipient selects to initiate an audio/video call, the e-mail client 118 can automatically interface with an audio/video phone or audio/video communications application to initiate the audio/video call.

FIG. 2 is a flow chart illustrating a method 200 of utilizing electronic communication activity information in accordance with another embodiment of the present invention. At step 202, from each of a plurality of electronic communication clients, activity information can be received. The activity information received from each electronic communication client can relate to activities of a respective electronic communication recipient accessing information associated with the electronic communication. The information can include an indication of an amount of time the electronic communication is open in the respective electronic communication client, an indication of whether the respective electronic communication recipient opens at least one attachment to the electronic communication, an indication of an amount of time at least one attachment to the electronic communication is open, an indication of whether the respective electronic communication recipient selects at least one hyperlink contained in the electronic communication to access content, an indication of an amount of time content accessed from at least one hyperlink contained in the electronic communication is open, an indication of an amount of time the recipient spends in an instant messaging session related to the electronic communication, an indication of a level of correlation between information exchanged in an instant messaging session and content of the electronic communication, and/or the like.

At step 204, based on the received activity information, via a processor, each of the plurality of electronic communication recipients can be rated with regard to who is able to provide to other recipients information pertaining to the electronic communication. At step 206, a request to receive a recommendation as to who is able to provide information pertaining to the electronic communication can be received from another electronic communication recipient. The other electronic communication recipient can be one of the plurality of electronic communication recipients for whom electronic communication activity is detected, though this need not be the case.

Optionally, at step 208, attributes of each of the plurality of electronic communication recipients related to attributes of the other electronic communication recipient can be identified. At step 210, optionally, attributes of each of the respective plurality of electronic communication recipients can be weighted based upon a correspondence of such attributes with related attributes of the other electronic communication recipient. Optionally, at step 212, for each of the plurality of electronic communication recipients the weighted attributes can be processed with the rating of the respective electronic communication recipient.

At step 214, at least one recommendation as to who is able to provide information pertaining to the electronic communication to the other recipient can be generated. The recommendation can be based on the received activity information and, optionally, further based on the respective weighted attributes. At step 216, the recommendation can be communicated to the other electronic communication recipient.

FIG. 3 is a flow chart illustrating another method 300 of utilizing electronic communication activity information in accordance with another embodiment of the present invention. At step 302, via an electronic communication client executed by a processor, activity information relating to activities of a respective electronic communication recipient associated with an electronic communication can be monitored. The activity information can indicate at least an amount of time that the electronic communication is opened in the electronic communication client. The activity information further can indicate whether an at least one attachment to the electronic communication has been opened by the electronic communication recipient, an amount of time at least one attachment to the electronic communication is open by the electronic communication recipient, an amount of time at least one attachment to the electronic communication is open by the electronic communication recipient, whether the respective electronic communication recipient selects at least one hyperlink contained in the electronic communication to access content, and/or the like. At step 304, the activity information can be communicated to an electronic communication server.

Figure 4:
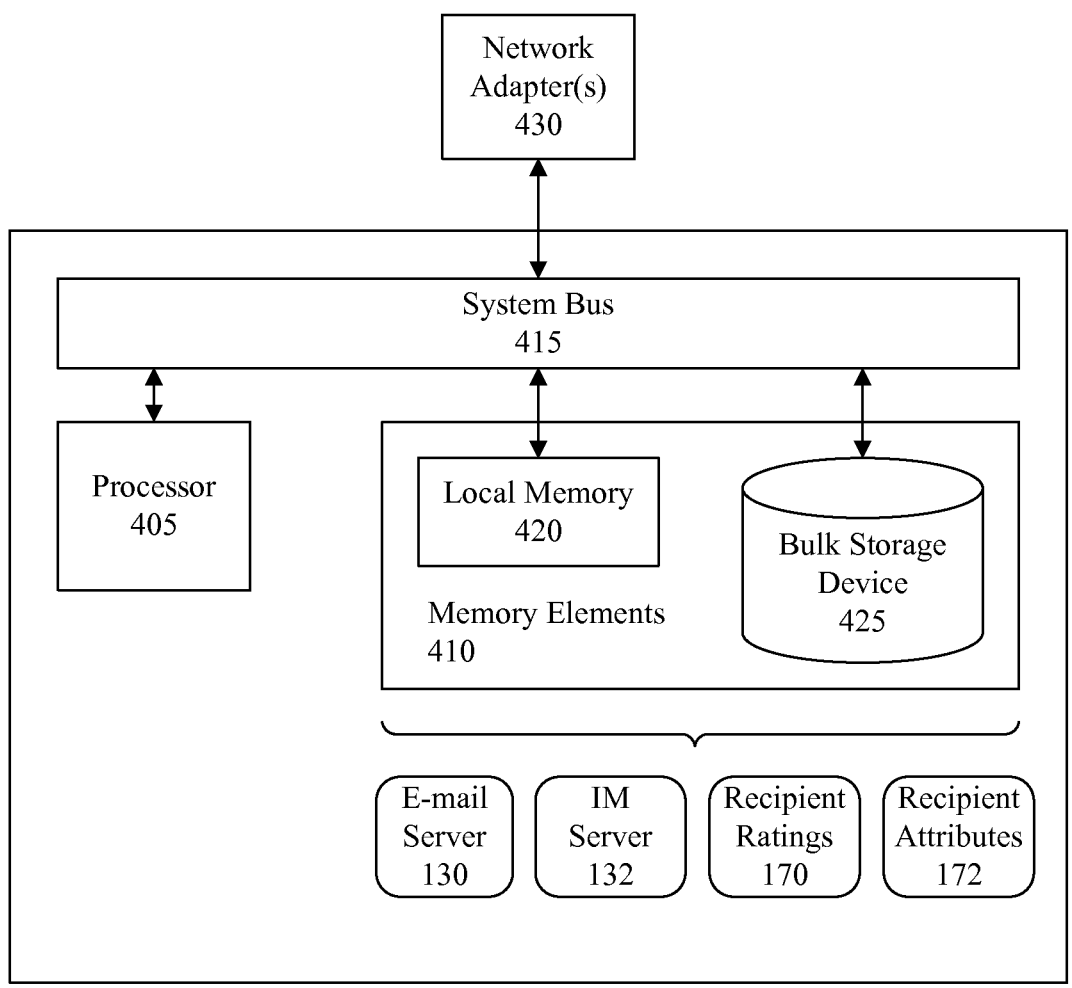
FIG. 4 is a block diagram illustrating a server device in accordance with one embodiment of the present invention.

FIG. 4 is a block diagram illustrating a server device 110 in accordance with one embodiment of the present invention. The server device 110 can include at least one the processor 405 coupled to memory elements 410 through a system bus 415. As such, the server device 110 can store program code within the memory elements 410. The processor 405 can execute the program code accessed from the memory elements 410 via the system bus 415. In one aspect, for example, the server device 110 can be implemented as computer that is suitable for storing and/or executing program code. It should be appreciated, however, that the server device 110 can be implemented in the form of any system comprising a processor and memory that is capable of performing the functions described within this specification.

The memory elements 410 can include one or more physical memory devices such as, for example, local memory 420 and one or more bulk storage devices 425. Local memory 420 refers to random access memory or other non-persistent memory device(s) generally used during actual execution of the program code. The bulk storage device(s) 425 can be implemented as a HDD, SSD, or other persistent data storage device. The server device 110 also can include one or more cache memories (not shown) that provide temporary storage of at least some program code in order to reduce the number of times program code must be retrieved from bulk storage device 425 during execution.

Input/output (I/O) devices such as a keyboard, a display, and a pointing device (not shown) optionally can be coupled to the server device 110. The I/O devices can be coupled to the server device 110 either directly or through intervening I/O controllers. Network adapters 430 also can be coupled to the server device 110 to enable the server device 110 to become coupled to other systems, computer systems, remote printers, and/or remote storage devices through intervening private or public networks. Modems, cable modems, and Ethernet cards are examples of different types of network adapters 430 that can be used with the server device 110.

As pictured in FIG. 4, the memory elements 410 can store the e-mail server 130, the IM server 132, the recipient ratings 170 and the recipient attributes 172. The e-mail server 130 and IM server 132, each being implemented in the form of executable program code, can be executed by the server device 110 to implement the server-side processes and methods described herein.

Figure 5:
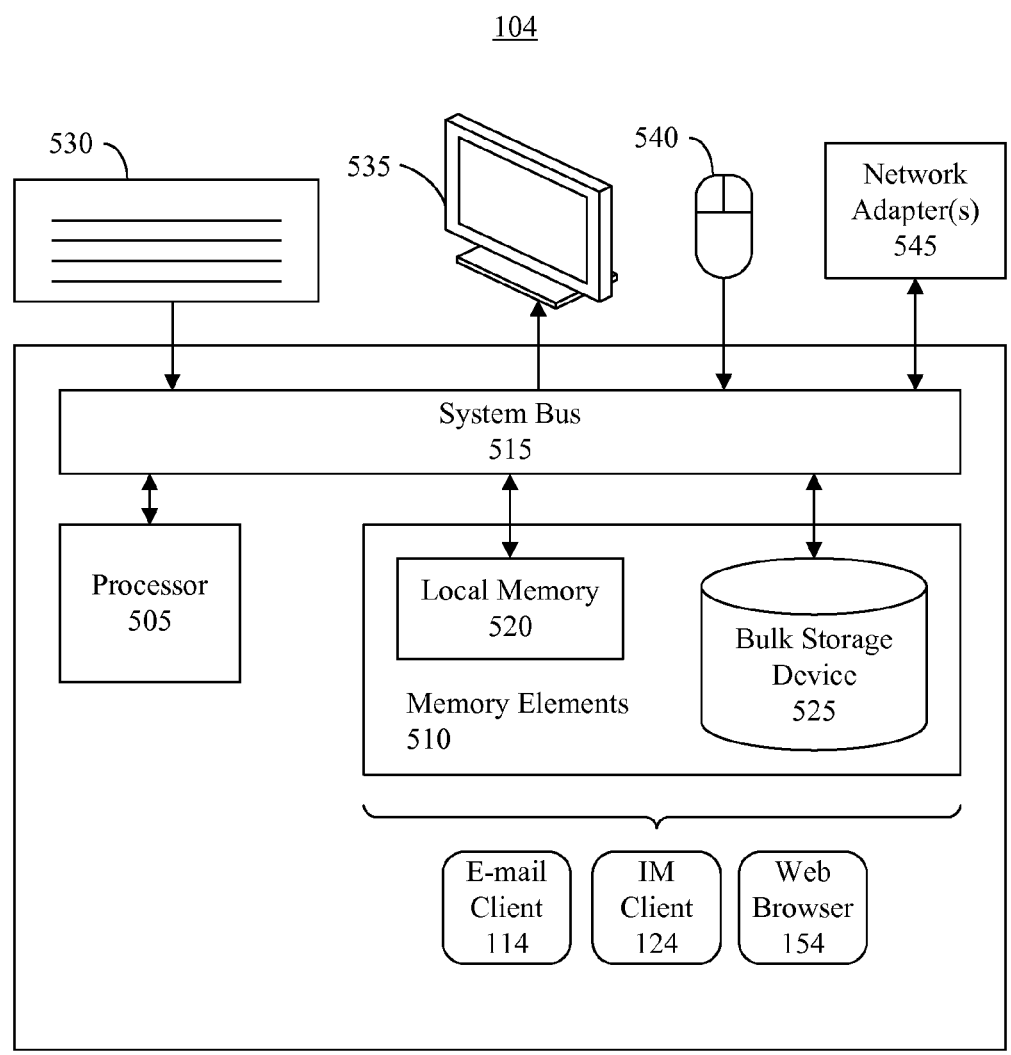
FIG. 5 is a block diagram illustrating a client device in accordance with one embodiment of the present invention.

FIG. 5 is a block diagram illustrating a client device 104 in accordance with one embodiment of the present invention. The client device 104 can include at least one the processor 505 coupled to memory elements 510 through a system bus 515. As such, the client device 104 can store program code within the memory elements 510. The processor 505 can execute the program code accessed from the memory elements 510 via the system bus 515. In one aspect, for example, the client device 104 can be implemented as computer that is suitable for storing and/or executing program code. It should be appreciated, however, that the client device 104 can be implemented in the form of any system comprising a processor and memory that is capable of performing the functions described within this specification.

The memory elements 510 can include one or more physical memory devices such as, for example, local memory 520 and one or more bulk storage devices 525. Local memory 520 refers to random access memory or other non-persistent memory device(s) generally used during actual execution of the program code. The bulk storage device(s) 525 can be implemented as a HDD, SSD, or other persistent data storage device. The client device 104 also can include one or more cache memories (not shown) that provide temporary storage of at least some program code in order to reduce the number of times program code must be retrieved from bulk storage device 525 during execution.

Input/output (I/O) devices such as a keyboard 530, a display 535, and a pointing device 540 can be coupled to the client device 104. The I/O devices can be coupled to the client device 104 either directly or through intervening I/O controllers. Network adapters 545 also can be coupled to the client device 104 to enable the client device 104 to become coupled to other systems, computer systems, remote printers, and/or remote storage devices through intervening private or public networks. Modems, cable modems, and Ethernet cards are examples of different types of network adapters 545 that can be used with the client device 104.

As pictured in FIG. 5, the memory elements 510 can store the e-mail client 114, the IM client 124 and the web browser 154. The e-mail client 114, the IM client 124 and the web browser 154, each being implemented in the form of executable program code, can be executed by the client device 104 to implement the client-side processes and methods described herein.

Like numbers have been used to refer to the same items throughout this specification. In one embodiment, the workflow server can be implemented as IBM® Lotus Notes® (IBM and Lotus Notes are trademarks of International Business Machines Corporation in the United States, other countries, or both).

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of utilizing electronic communication activity information, the method comprising:
receiving from each of a plurality of electronic communication clients activity information relating to activities of a respective electronic communication recipient accessing information associated with the electronic communication, wherein the activity information indicates an amount of time content accessed from at least one hyperlink contained in the electronic communication is open, wherein the electronic communication is an e-mail, instant message or text message received by each of the electronic communication recipients;
based on the received activity information, via a processor, rating each of the electronic communication recipients to generate at least one recommendation as to who is able to provide information pertaining to the electronic communication; and
communicating the recommendation to another electronic communication recipient.

2. The method of claim 1, further comprising:
receiving from the other electronic communication recipient a request to receive the recommendation;
wherein the recommendation is communicated to the other electronic communication recipient in response to the request.

3. The method of claim 2, further comprising:
identifying attributes for each of the respective electronic communication recipients related to attributes of the other electronic communication recipient;
respectively, weighting attributes of each of the plurality of electronic communication recipients based upon a correspondence of such attributes with attributes of the other electronic communication recipient; and
for each of the plurality of electronic communication recipients, processing the weighted attributes with the rating of the respective electronic communication recipient;
wherein generating the at least one recommendation is based, at least in part, on the respective weighted attributes.

4. The method of claim 1, wherein receiving from each of the plurality of electronic communication clients activity information relating to activities of the respective electronic communication recipient comprises:
receiving an indication of an amount of time the electronic communication is open in the respective electronic communication client.

5. The method of claim 1, wherein receiving from each of the plurality of electronic communication clients activity information relating to activities of the respective electronic communication recipient comprises:
receiving an indication of whether the respective electronic communication recipient opens at least one attachment to the electronic communication.

6. The method of claim 1, wherein receiving from each of the plurality of electronic communication clients activity information relating to activities of the respective electronic communication recipient comprises:
receiving an indication of an amount of time at least one attachment to the electronic communication is open.

7. The method of claim 1, wherein receiving from each of the plurality of electronic communication clients activity information relating to activities of the respective electronic communication recipient comprises:
receiving an indication of whether the respective electronic communication recipient selects the at least one hyperlink contained in the electronic communication to access content.

8. The method of claim 1, wherein receiving from each of the plurality of electronic communication clients activity information relating to activities of the respective electronic communication recipient comprises:
receiving an indication of an amount of time the recipient spends in an instant messaging session related to the electronic communication.

9. The method of claim 1, wherein receiving from each of the plurality of electronic communication clients activity information relating to activities of the respective electronic communication recipient comprises:
receiving an indication of a level of correlation between information exchanged in an instant messaging session and content of the electronic communication.

10. A method of utilizing electronic communication activity information, the method comprising:
via an electronic communication client executed by a processor, monitoring activity information relating to activities of a respective electronic communication recipient associated with an electronic communication, the activity information indicating at least an amount of time content accessed from at least one hyperlink contained in the electronic communication is open in the electronic communication client, wherein the electronic communication is an e-mail, instant message or text message received by each of the electronic communication recipients; and
communicating to an electronic communication server the activity information.

11. The method of claim 10, wherein the activity information further indicates whether an at least one attachment to the electronic communication has been opened by the electronic communication recipient.

12. The method of claim 10, wherein the activity information further indicates an amount of time at least one attachment to the electronic communication is open by the electronic communication recipient.

13. The method of claim 10, wherein the activity information further indicates whether the respective electronic communication recipient selects the at least one hyperlink contained in the electronic communication to access content.

14. A computer program product for utilizing electronic communication activity information, the computer program product comprising:
a computer-readable storage device having computer-readable program code embodied therewith, the computer-readable program code comprising:
computer-readable program code configured to receive from each of a plurality of electronic communication clients activity information relating to activities of a respective electronic communication recipient accessing information associated with the electronic communication, wherein the activity information indicates an amount of time content accessed from at least one hyperlink contained in the electronic communication is open, wherein the electronic communication is an e-mail, instant message or text message received by each of the electronic communication recipients;
computer-readable program code configured to, based on the received activity information, rate each of the electronic communication recipients to generate at least one recommendation as to who is able to provide information pertaining to the electronic communication; and
computer-readable program code configured to communicate the recommendation to another electronic communication recipient.

15. The computer program product of claim 14, further comprising:
computer-readable program code configured to receive from the other electronic communication recipient a request to receive the recommendation, wherein the recommendation is communicated to the other electronic communication recipient in response to the request;
computer-readable program code configured to identify attributes for each of the respective electronic communication recipients related to attributes of the other electronic communication recipient;
computer-readable program code configured to, respectively, weight attributes of each of the plurality of electronic communication recipients based upon a correspondence of such attributes with attributes of the other electronic communication recipient; and
computer-readable program code configured to, for each of the plurality of electronic communication recipients, process the weighted attributes with the rating of the respective electronic communication recipient;
wherein generating the at least one recommendation is based, at least in part, on the respective weighted attributes.

16. The computer program product of claim 14, wherein the computer-readable program code configured to receive from each of the plurality of electronic communication clients activity information relating to activities of the respective electronic communication recipient comprises:

computer-readable program code configured to receive an indication of an amount of time the electronic communication is open in the respective electronic communication client.

17. The computer program product of claim 14, wherein the computer-readable program code configured to receive from each of the plurality of electronic communication clients activity information relating to activities of the respective electronic communication recipient comprises:

computer-readable program code configured to receive an indication whether the respective electronic communication recipient opens at least one attachment to the electronic communication.

18. The computer program product of claim 14, wherein the computer-readable program code configured to receive from each of the plurality of electronic communication clients activity information relating to activities of the respective electronic communication recipient comprises:

computer-readable program code configured to receive an indication of amount of time at least one attachment to the electronic communication is open.

19. The computer program product of claim 14, wherein the computer-readable program code configured to receive from each of the plurality of electronic communication clients activity information relating to activities of the respective electronic communication recipient comprises:

computer-readable program code configured to receive an indication of whether the respective electronic communication recipient selects the at least one hyperlink contained in the electronic communication to access content.

20. The computer program product of claim 14, wherein the computer-readable program code configured to receive from each of the plurality of electronic communication clients activity information relating to activities of the respective electronic communication recipient comprises:

computer-readable program code configured to receive an indication of an amount of time the recipient spends in an instant messaging session related to the electronic communication.

21. The computer program product of claim 14, wherein the computer-readable program code configured to receive from each of the plurality of electronic communication clients activity information relating to activities of the respective electronic communication recipient comprises:

computer-readable program code configured to receive an indication of a level of correlation between information exchanged in an instant messaging session and content of the electronic communication.

22. A computer program product for utilizing electronic communication activity information, the computer program product comprising: a computer-readable storage medium having computer-readable program code embodied therewith, the computer-readable program code comprising:

computer-readable program code configured to, from an electronic communication client, monitor activity information relating to activities of a respective electronic communication recipient associated with an electronic communication, the activity information indicating at least an amount of time content accessed from at least one hyperlink contained in the electronic communication is open in the electronic communication client, wherein the electronic communication is an e-mail, instant message or text message received by each of the electronic communication recipients; and computer-readable program code configured to communicate to an electronic communication server the activity information.

23. The computer program product of claim 22, wherein the activity information further indicates whether at least one attachment to the electronic communication has been opened by the electronic communication recipient, an amount of time the at least one attachment to the electronic communication is open by the electronic communication recipient, or whether the respective electronic communication recipient selects the at least one hyperlink contained in the electronic communication to access content.

\* \* \* \* \*